United States Patent
Hagano

(10) Patent No.: US 10,843,554 B2
(45) Date of Patent: Nov. 24, 2020

(54) FUEL SUPPLY DEVICE

(71) Applicant: TOYODA GOSEI CO., LTD., Kiyosu (JP)

(72) Inventor: Hiroyuki Hagano, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 62 days.

(21) Appl. No.: 16/259,115

(22) Filed: Jan. 28, 2019

(65) Prior Publication Data

US 2019/0232781 A1    Aug. 1, 2019

(30) Foreign Application Priority Data

Jan. 31, 2018   (JP) ................. 2018-014513

(51) Int. Cl.
*B60K 15/035*   (2006.01)
*B60K 15/04*    (2006.01)

(52) U.S. Cl.
CPC .... *B60K 15/04* (2013.01); *B60K 2015/03538* (2013.01); *B60K 2015/0429* (2013.01); *B60K 2015/0458* (2013.01); *B60K 2015/0461* (2013.01); *B60K 2015/0474* (2013.01)

(58) Field of Classification Search
CPC .......... B60K 15/04; B60K 2015/03538; B60K 2015/0429; B60K 2015/0458; B60K 2015/0461; B60K 2015/0474
USPC ....................................................... 220/86.2
See application file for complete search history.

(56) References Cited

U.S. PATENT DOCUMENTS

| | | | |
|---|---|---|---|
| 6,752,448 B1* | 6/2004 | Hsu ................ | B60K 15/05 220/86.2 |
| 8,215,333 B2* | 7/2012 | Stokes ............. | B60K 15/04 137/312 |
| 10,065,496 B2* | 9/2018 | Frank .............. | B60K 15/04 |
| 10,322,631 B2* | 6/2019 | Sasaki ............. | B60K 15/0406 |
| 10,442,289 B2* | 10/2019 | Hagano ........... | B60K 15/0406 |
| 10,493,842 B2* | 12/2019 | Hatanaka ......... | B60K 15/04 |
| 10,596,900 B2* | 3/2020 | Bachmann ....... | B60K 15/04 |
| 2012/0024422 A1* | 2/2012 | Cisternino ....... | B60K 15/04 141/349 |
| 2012/0181274 A1* | 7/2012 | Fetzer ............. | B29C 66/12821 220/86.2 |

(Continued)

FOREIGN PATENT DOCUMENTS

| JP | 2017-501925 A | 1/2017 |
|---|---|---|
| JP | 2017-071361 A | 4/2017 |

*Primary Examiner* — J. Gregory Pickett
*Assistant Examiner* — Niki M Eloshway
(74) *Attorney, Agent, or Firm* — Posz Law Group, PLC

(57) ABSTRACT

In a fuel port forming portion that forms a fuel port, a portion of a peripheral wall located on a perpendicular lower side when a fuel supply device is in a mounting posture of being mounted to a vehicle formed as a convex drain groove from a corner portion at which an insertion-side open/close member for opening/closing the fuel port makes contact with an open base portion of the fuel port to an open end side of the fuel port. The drain groove is inclined in a horizontal direction such that the open end side of the fuel port is located closer to the perpendicular lower side than a corner portion side when the fuel supply device is in the mounting posture, to thereby improve draining function of the drain groove provided to the fuel port.

10 Claims, 20 Drawing Sheets

(56) References Cited

U.S. PATENT DOCUMENTS

| | | | |
|---|---|---|---|
| 2013/0168392 A1* | 7/2013 | Kuyama | B60K 15/04 220/86.2 |
| 2014/0061192 A1* | 3/2014 | Aitken | B60K 15/05 220/86.2 |
| 2014/0284329 A1* | 9/2014 | Frank | B60K 15/03006 220/86.2 |
| 2015/0158379 A1 | 6/2015 | Stancu et al. | |
| 2018/0290538 A1 | 10/2018 | Hirose et al. | |

* cited by examiner

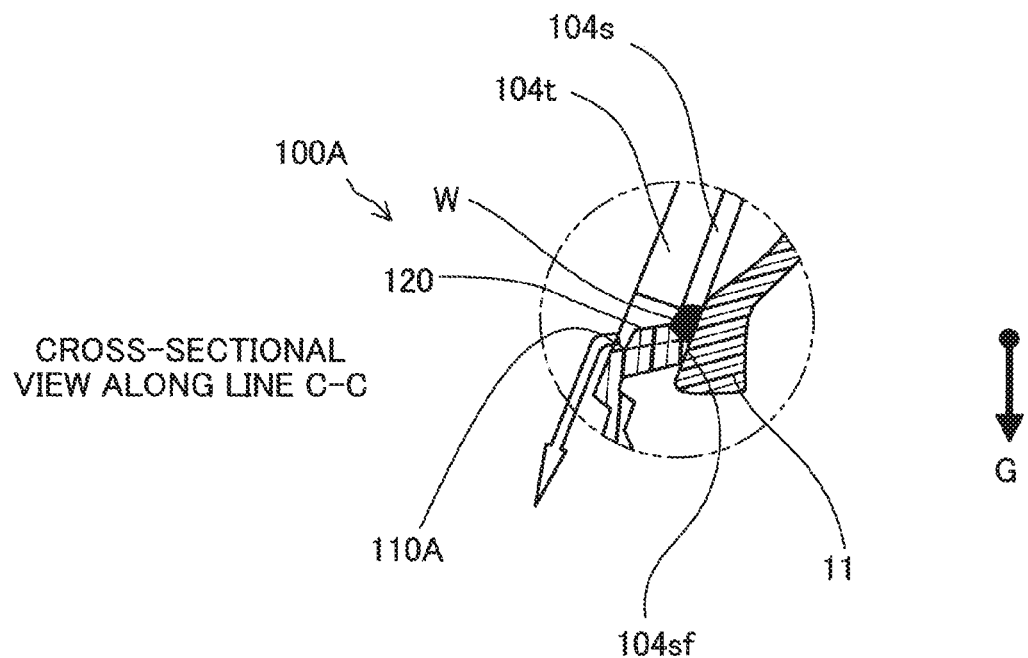

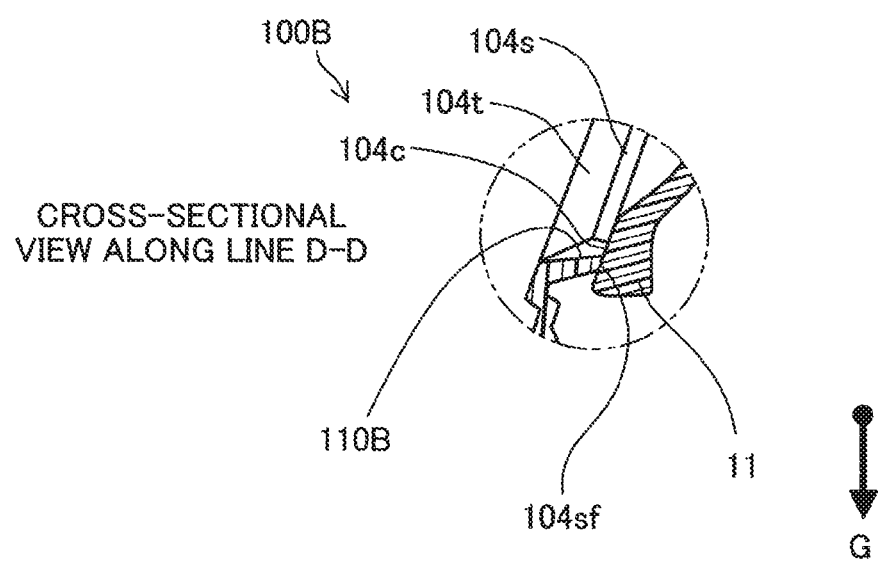

FUEL SUPPLY DEVICE

CROSS-REFERENCE TO RELATED APPLICATIONS

The present application claims priority from Japanese application P2018-14513 filed on Jan. 31, 2018 the content of which is hereby incorporated by reference into this application.

BACKGROUND

Field

The present disclosure relates to a fuel supply device.

Related Art

In a fuel supply device, a fuel port is closed by an open/close member when fuel is not supplied and opened when fuel is supplied by being pressed by the open/close member with a fuel nozzle. When the fuel port is closed, a fuel port forming portion that forms the fuel port and the open/close member are in close contact with each other. Because of this, rainwater or the like accumulates on the open/close member which is surrounded by the peripheral wall of the fuel port. Liquid in the form of the rainwater that has accumulated on the open/close member is herein simply referred to as "accumulated rainwater". This accumulated rainwater drops from the fuel port onto a fuel supply path when the open/close member opens during subsequent fuel supply. As a result, there has been proposed in, for example, Japanese Patent Unexamined Publication 2017-71361 and Japanese Translation of PCT International Application Publication 2017-501925, adding a drain groove at a portion of the peripheral wall of the fuel port to prevent rainwater from accumulating.

SUMMARY

However, a drain groove does not completely drain the accumulated rainwater, meaning that some accumulated rainwater may remain. As a result, it has been identified that there is room for improvement in terms of improving draining function with a drain groove.

The present disclosure has been made in light of the above-mentioned problem and can be implemented in the form of the following aspects.

(1) One aspect of a fuel supply device is a fuel supply device to be mounted to a vehicle, the fuel supply device including a fuel port forming portion including a peripheral wall that forms a fuel port that receives a fuel nozzle from an open end side, and a fuel path that extends from the fuel port to a fuel tank; and an insertion-side open/close member that can open/close an open base portion of the fuel port from the fuel path side and moves to a fuel port open position as a result of insertion of the fuel nozzle, in which, in the fuel port forming portion, a portion of the peripheral wall located on a perpendicular lower side when the fuel supply device is in a mounting posture of being mounted to the vehicle formed as a concave drain groove that extends from a corner portion at which the insertion-side open/close member makes contact with the fuel port on the open base portion side to the open end side of the fuel port, the drain groove being inclined in a horizontal direction such that the open end side is located closer to the perpendicular lower side than the corner portion side when the fuel supply device is in the mounting posture.

In the fuel supply device according to this aspect, a portion of the peripheral wall located on the perpendicular lower side when the fuel supply device is in the mounting posture of being mounted to the vehicle is formed as a concave drain groove, and this drain groove is a groove that extends from an open end of the fuel port to the corner portion. Therefore, the drain groove is continuous with the fuel port at the corner portion on the perpendicular lower side. Because of this, accumulated rainwater on the insertion-side open/close member which is surrounded by the peripheral wall of the fuel port in the vicinity of the drain groove is drawn into the drain groove to inevitably enter the drain groove. In addition, because the drain groove is inclined in the horizontal direction such that the side of the open end is located closer to the perpendicular lower side than the side of the corner portion, the accumulated rainwater that has entered the drain groove at the corner portion is discharged along the drain groove. As a result, the drain groove in the fuel supply device according to this aspect can improve draining function.

(2) Another aspect of a fuel supply device is a fuel supply device to be mounted to a vehicle, the fuel supply device including an outer body including a peripheral wall that forms a fuel port that receives a fuel nozzle from an open end side, and a fuel path that extends from the fuel port to a fuel tank; and an insertion-side open/close member that can open/close a lower end-side end face of the fuel port from the fuel path side and moves to a fuel port open position as a result of insertion of the fuel nozzle, in which, in the outer body, a portion of the peripheral wall located on a perpendicular lower side when the fuel supply device is in a mounting posture of being mounted to the vehicle is formed as a concave drain groove that is cut out from the open end side of the fuel port to the lower end-side end face, and the drain groove being inclined in a horizontal direction such that the open end side is located closer to the perpendicular lower side than the lower end-side end face side when the fuel supply device is in the mounting posture.

In the fuel supply device according to this aspect, a portion of the peripheral wall located on the perpendicular lower side when the fuel supply device is in the mounting posture of being mounted to the vehicle is formed as a concave drain groove, and this drain groove is a concave groove that is cut out from an open end of the fuel port to the lower end-side end face. Therefore, the drain groove is continuous with the fuel port at a cutout portion of the lower end-side end face on the perpendicular lower side. Because of this, the accumulated rainwater on the insertion-side open/close member which is surrounded by the peripheral wall of the fuel port in the vicinity of the drain groove is drawn into the drain groove to inevitably enter the drain groove. In addition, because the drain groove is inclined in the horizontal direction such that a side of the open end is located closer to the perpendicular lower side than the cutout portion of the lower end-side end face of the fuel port, the accumulated rainwater that has entered the drain groove at the cutout portion of the lower end-side end face is discharged along the drain groove. As a result, the draining function can be improved with the drain groove in the fuel supply device according to this aspect.

(3) In the fuel supply device according to the above-described aspect, the drain groove may be formed so as to be inclined toward a diameter expansion side of the fuel port at an angle within a prescribed range exceeding 90° with respect to a front surface of the insertion-side open/close member that closes the fuel port. With this configuration, because the drain groove is more reliably inclined toward the perpendicular lower side such that the side of the open end is located on the perpendicular lower side in the horizontal direction, drainage of the accumulated rainwater along the drain groove can be improved and draining function can be further improved.

(4) In the fuel supply device according to the above-described aspect, the drain groove may include a groove base portion formed with a convex rib along a groove longitudinal direction. With this configuration, the drain groove is a plurality of grooves subdivided by the convex rib in the groove longitudinal direction, and hence draining function is improved.

(5) In the fuel supply device according to the above-described aspect, the drain groove may include a groove base portion formed with a concave groove along a groove longitudinal direction. With this configuration, the drain groove can improve draining function through the long and thin concave groove, which is narrower than the drain groove, promoting drainage.

(6) In the fuel supply device according to the above-described aspect, the drain groove may be formed with a V-shaped groove cross section. With this configuration, a drain groove having high draining function can be easily formed.

Note that the present disclosure can be implemented in the form of various aspects. For example, the present disclosure can be implemented as a fuel tank that includes a fuel supply device.

BRIEF DESCRIPTION OF THE DRAWINGS

FIG. 11B is an explanatory diagram for schematically illustrating the state of accumulated rainwater in the filler neck according to the first modification example when viewed as a cross section taken along the line C-C;

FIG. 12B is an explanatory diagram for schematically illustrating a cross section of the principle part of the filler neck according to the second modification example taken along the line D-D;

DESCRIPTION OF THE PREFERRED EMBODIMENTS

Figure 1:
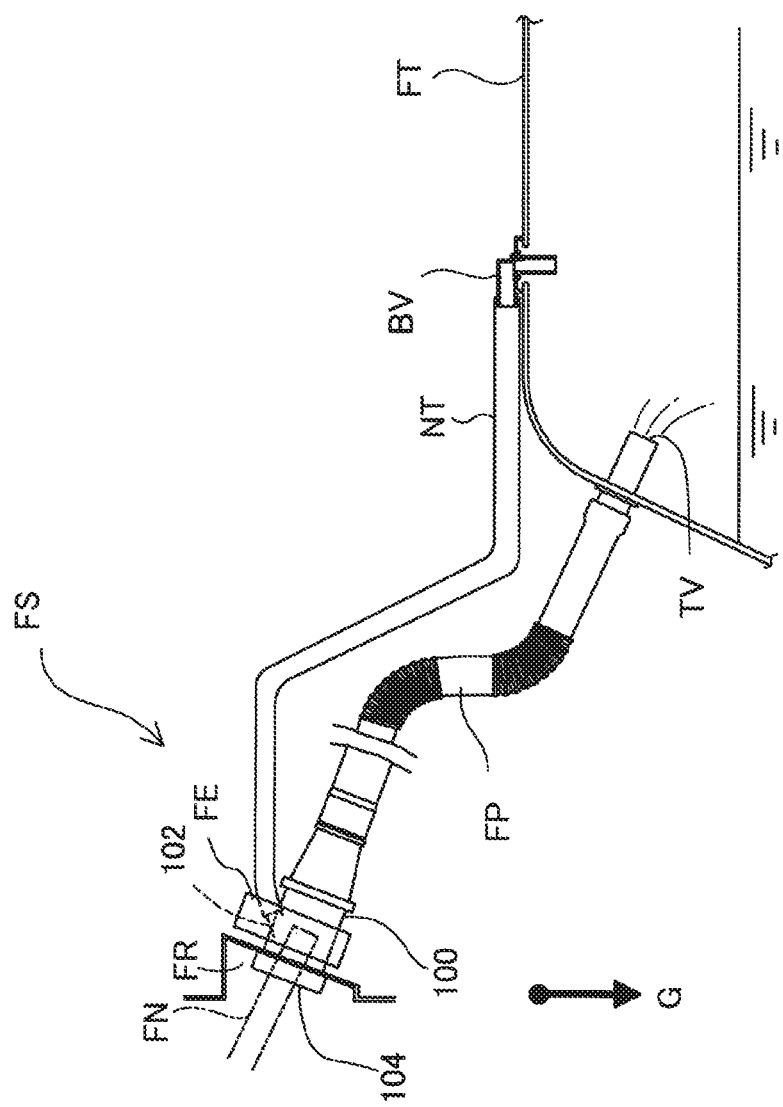
FIG. 1 is an explanatory diagram for illustrating an outline of a fuel supply device including a fuel supply device according to an embodiment.

FIG. 1 is an explanatory diagram for illustrating an overall configuration common to a fuel supply device FS according to the embodiments described below. The fuel supply device FS is mounted to a vehicle and guides fuel supplied by a fuel nozzle FN to a fuel tank FT. FIG. 1 and subsequent drawings include an arrow G which indicates a perpendicular direction. The fuel supply device FS includes a filler neck 100, a fuel vapor port 102, a filler pipe FP, a check valve TV, a fuel vapor tube NT, a gas release valve BV and a mounting member FE. The filler neck 100 is mounted to a fuel chamber FR of the vehicle using a mounting member FE and receives insertion of the fuel nozzle FN toward the fuel port 104. Note that, in place of the mounting member FE shown in the drawings, the filler neck 100 can be mounted to the fuel chamber FR using a circular substrate formed with a circular hole at the middle through which a portion of the filler neck 100 is inserted.

The filler neck 100 is connected to a fuel tank FT using the filler pipe FP and the fuel vapor tube NT. The filler neck 100 guides liquid fuel such as gasoline from the fuel nozzle FN inserted into the fuel port 104 to the fuel tank FT via the filler pipe FP. The filler pipe FP is, for example, a resin tube that has a bellows structure at two portions and can expand/contract and bend within a certain range. The check valve TV is provided at an outlet of the filler pipe FP on the fuel tank FT. The check valve TV prevents the fuel from flowing back. The fuel that has been discharged from the fuel nozzle FN inserted into the fuel port 104 passes through the filler pipe FP and a fuel path (described later) formed by the filler neck 100 to be guided from the check valve TV to the fuel tank FT. The check valve TV prevents the fuel from flowing back to the filler pipe FP from the fuel tank FT.

One end of the fuel vapor tube NT is connected to the fuel tank FT via the gas release valve BV. Another end of the fuel vapor tube NT is connected to the fuel vapor port 102 which protrudes outward from the filler neck 100. The gas release valve BV also functions as a connector for connecting the fuel vapor tube NT to the fuel tank FT. Tank air containing fuel vapor flows into the fuel vapor tube NT from the gas release valve BV. The tank vapor is guided to the fuel tank FT through the filler pipe FP together with supplied fuel when fuel is supplied from the fuel nozzle FN.

Figure 2:
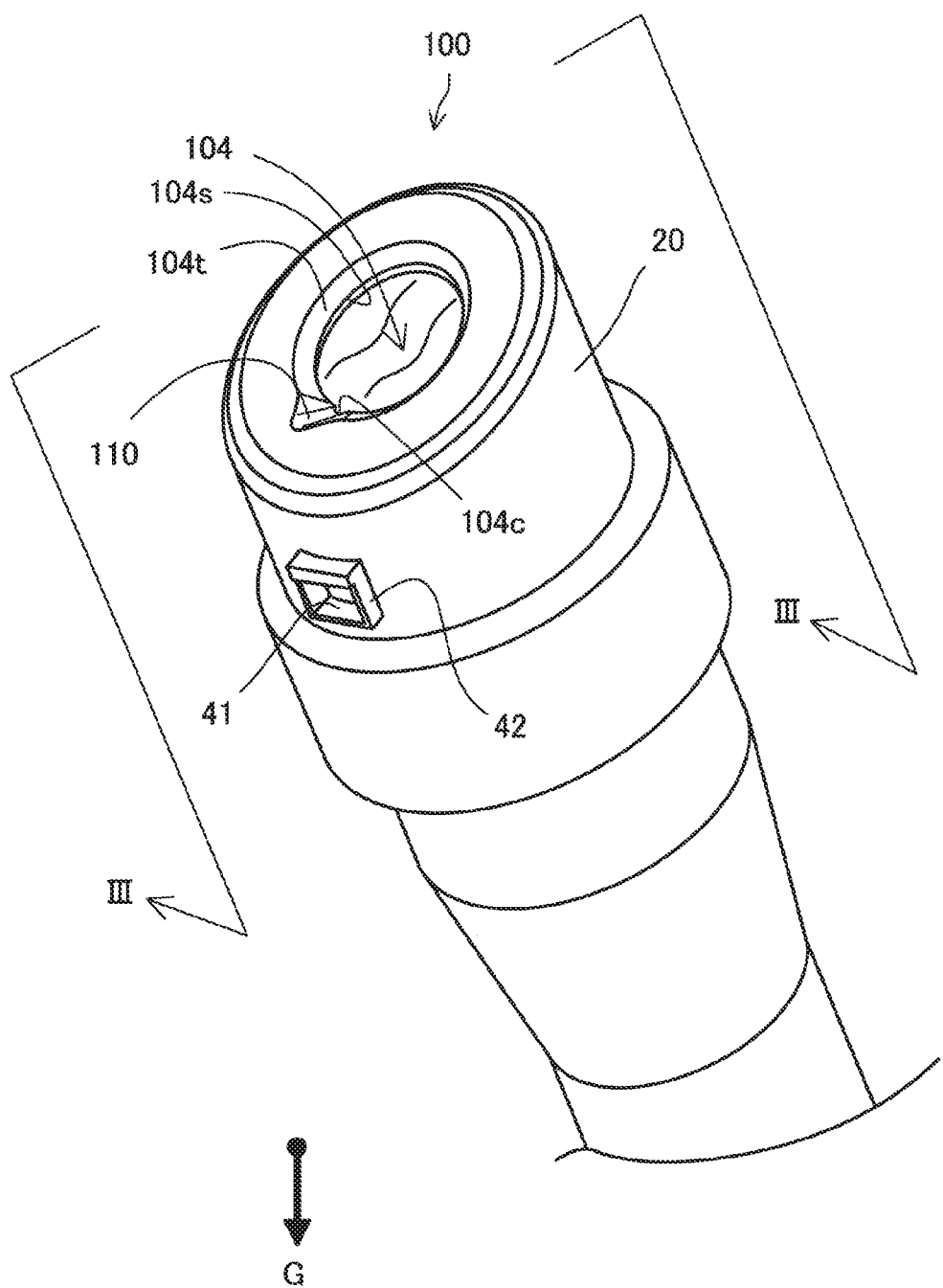
FIG. 2 is a perspective diagram for illustrating an outline of a filler neck that functions as the fuel supply device according to the embodiment.
Figure 3:
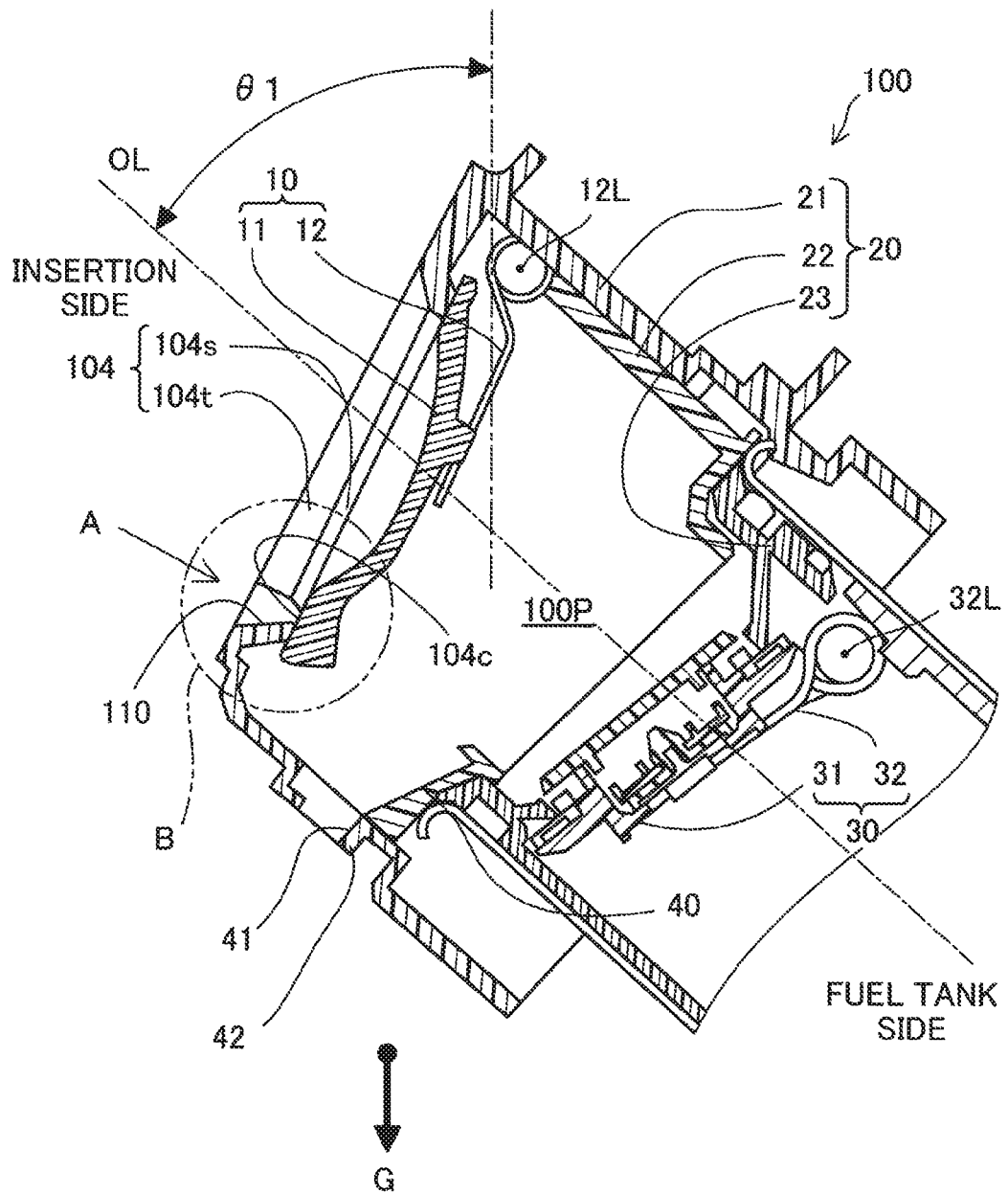
FIG. 3 is an explanatory diagram for illustrating a cross section of the principle part of the filler neck taken along the line III-III in FIG. 2.
Figure 4:
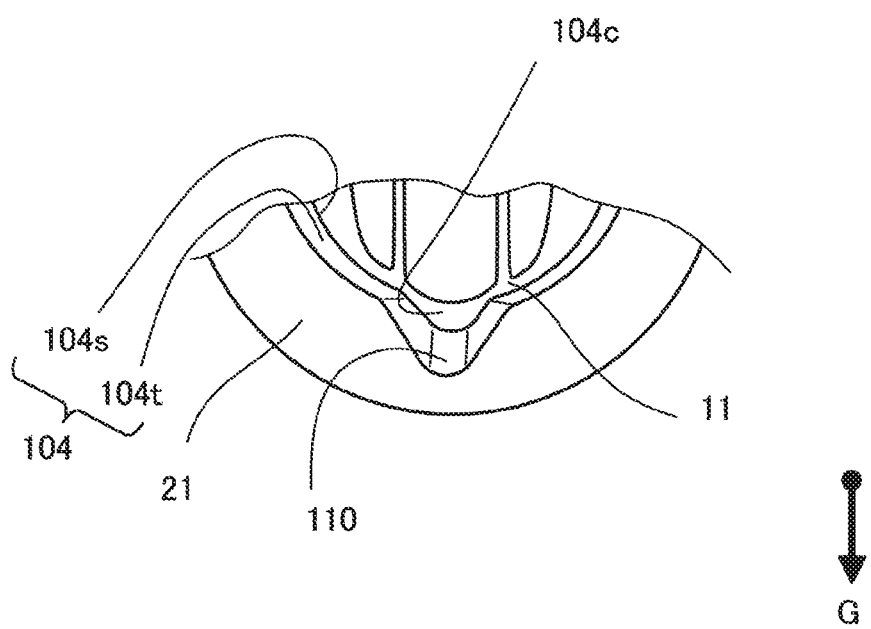
FIG. 4 is an explanatory diagram for illustrating the principle part of the filler neck when viewed from the front in a direction of the arrow A in FIG. 3.
Figure 5:
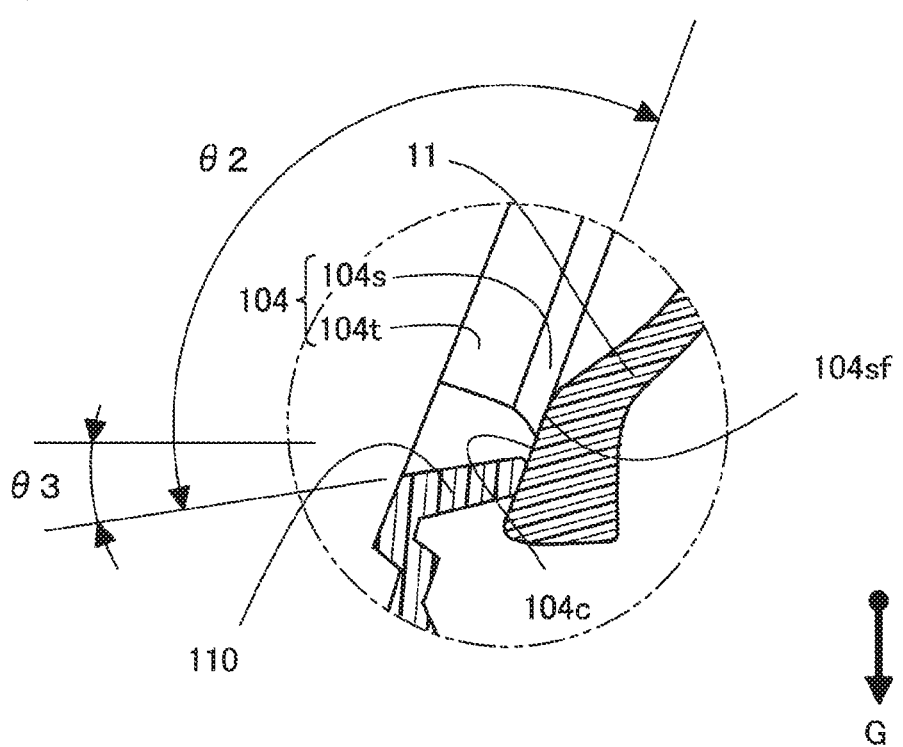
FIG. 5 is an explanatory diagram for illustrating the principle part portion B in FIG. 3 when magnified.

Next, a detailed structure of the filler neck 100 is described with reference to the figures. FIG. 2 is a perspective diagram for illustrating an outline of the filler neck 100 that functions as the fuel supply device according to the embodiment. FIG. 3 is an explanatory diagram for illustrating a cross section of a principle part of the filler neck 100 taken along the line III-III in FIG. 2. FIG. 4 is an explanatory diagram for illustrating the principle part of the filler neck 100 when viewed from the front in a direction of the arrow A in FIG. 3. FIG. 5 is an explanatory diagram for illustrating a principle part portion B in FIG. 3 when magnified. Note that, herein, being closer to the fuel tank than the fuel port 104 is referred to as a "fuel tank side" as required and being closer to the fuel port 104 than the fuel tank is referred to as an "insertion side" as required. In addition, in FIG. 3, some internal components are illustrated such that their cross-sectional shape is viewed from an end surface in order to facilitate understanding.

As illustrated in FIGS. 2 and 3, the filler neck 100 includes a fuel path forming portion 20 that forms a fuel path 100P, a fuel port open/close mechanism 10, a fuel tank-side open/close valve mechanism 30 and a discharge path forming portion 40. The fuel path forming portion 20 is formed into a tubular shape and includes an outer body 21 that forms the fuel port 104 to which the fuel nozzle FN (see FIG. 1) is inserted, an inner body 22 that surrounds the fuel path 100P on the insertion side and an under body 23 into which the fuel tank-side open/close valve mechanism 30 is incorporated on the fuel tank side. The fuel path 100P is surrounded by the above-mentioned bodies and guides liquid fuel supplied from the fuel port 104 to the fuel tank side along a shaft OL. The outer body 21 corresponds to a fuel port forming portion in the claims of this application, and forms the fuel port 104 in which a tapered nozzle insertion-side peripheral wall 104t is continuous with a substantially circular hole-shaped fuel port peripheral wall 104s. In this embodiment, the above-described bodies are molded of a fuel-resistant resin such as polyamide (PA).

The fuel port open/close mechanism 10 is disposed on the outer body 21 and opens/closes the fuel port 104. The fuel port open/close mechanism 10 moves to a fuel port open position as a result of the fuel nozzle FN being inserted into the fuel port 104, to thereby open the fuel port 104. When the fuel nozzle is not inserted, the fuel port open/close mechanism 10 closes an open base portion of the fuel port 104 from the fuel path 100P side. The fuel port open/close mechanism 10 includes an insertion-side open/close member 11 for opening/closing the fuel port 104 and an insertion-side spring 12 that is fixed to the fuel path forming portion 20 and biases the insertion-side open/close member 11 in a closing direction. The insertion-side open/close member 11 is a component molded using a material that has higher hydrophobicity than the outer body 21, for example, polyphenylene sulfide (PPS). The insertion-side open/close member 11 is formed into a circular disc shape that is recessed in the center toward the fuel tank side. The insertion-side spring 12 is fixed to the fuel path forming portion 20 at a fixed end 12L and is fixed to the insertion-side open/close member 11 at a free end on a side opposite to the fixed end 12L. The insertion-side spring 12 rotates within the range of a predetermined angle about the fixed end 12L and biases the insertion-side open/close member 11 in a direction in which the fuel path 100P closes. Therefore, when fuel is not supplied, the insertion-side open/close member 11 is pushed against a lower end-side end face 104sf, which is an open base portion of the fuel port peripheral wall 104s in the fuel port 104, to close the fuel port 104. Note that the fuel port open/close mechanism 10 can be a pair of flap valves that open/close the fuel port 104 left/right or up/down as viewed from the front of the fuel port 104 as a result of the fuel nozzle FN being inserted.

In terms of the relationship between the above-described fuel port open/close mechanism 10 and the insertion-side open/close member 11, the lower end-side end face 104sf functions as a seating end face of the insertion-side open/close member 11 on a lower end side of the fuel port peripheral wall 104s of the outer body 21. The outer body 21 has a recessed drain groove 110 formed at a portion of the fuel port peripheral wall 104s which is the peripheral wall of the fuel port 104 and a portion of the nozzle insertion-side peripheral wall 104t. As illustrated in FIGS. 4 and 5, the drain groove 110 is a recessed drain groove that extends from a corner portion at which the insertion-side open/close member 11 makes contact with the fuel port peripheral wall 104s of the fuel port 104 to a side of the fuel port 104 on an open end, that is, to a tip of the nozzle insertion-side peripheral wall 104t. More specifically, the drain groove 110 is formed so as to have a V-shaped cross-section.

The drain groove 110 is located on a perpendicular direction side when the filler neck 100 is in a mounting posture of already mounted to the vehicle, more specifically, as illustrated in FIG. 3, when the filler neck 100 is in an inclined posture of being inclined by a predetermined angle θ1 (30° to 40°) in the perpendicular direction. In addition, a portion of the fuel port 104 at an open lower end of the fuel port 104 is cut out from the fuel port peripheral wall 104s to the nozzle insertion-side peripheral wall 104t to form the drain groove 110. Because of this, the lower end-side end face 104sf on the side of the open lower end is also cut out and becomes a cutout portion 104c. The fuel port 104 has a shape in which the cutout portion 104c is continuous on a perpendicular lower side of a substantially circular opening. The cutout portion 104c is a corner portion at which the insertion-side open/close member 11 makes contact with the fuel port peripheral wall 104s of the fuel port 104. In addition, as illustrated in FIG. 5, the drain groove 110 is formed so as to incline toward a diameter expansion side of the fuel port 104 at a diameter expansion angle θ2 within a prescribed range exceeding 90° (for example, 100 to 115°) with respect to a front surface of the insertion-side open/close member 11 pushed against the lower end-side end face 104sf acting as the seating end face of the fuel port 104. Due to this diameter expansion inclination, the drain groove 110 is inclined such that a tip side of the nozzle insertion-side peripheral wall 104t is positioned on a perpendicular lower side closer to the side of the cutout portion 104c in a horizontal direction under a state where the filler neck 100 is in the above-described inclined posture. The angle θ3 of that inclination is equal to or greater than 3° in the horizontal direction.

As illustrated in FIG. 3, the fuel tank-side open/close valve mechanism 30 is disposed on the under body 23 of the fuel path forming portion 20 closer to the fuel tank than the fuel port open/close mechanism 10 and opens/closes the fuel path 100P. The fuel tank-side open/close valve mechanism 30 includes a fuel tank-side open/close member 31 that opens/closes the fuel path 100P and a fuel tank-side spring 32 that is fixed to the fuel path forming portion 20 and biases the fuel tank-side open/close member 31 in a closing direction. The fuel tank-side open/close member 31 is a flap valve that prevents liquid fuel from flowing back to the insertion side from the fuel tank side. The fuel tank-side spring 32 is fixed to the fuel path forming portion 20 at the fixed end 32L and is fixed to the fuel tank-side open/close member 31 at a free end opposite to the fixed end 32L. The fuel tank-side spring 32 rotates within the range of a predetermined angle about the fixed end 32L and biases the fuel tank-side open/close member 31 in a direction in which the fuel path 100P closes. When the filler neck 100 is already mounted to the vehicle in the inclined posture illustrated in FIG. 3, the fuel tank-side spring 32 is disposed such that the fixed end 32L is higher in a gravity direction than the free end under a state where the fuel tank-side open/close valve mechanism 30 is closed.

The outer body 21 causes an internal area of the fuel path forming portion 20, more specifically, an internal area of the outer body 21 and the inner body 22 to communicate with outside the filler neck 100 via a drain port 41. Note that, similar to the drain groove 110, when the filler neck 100 is already mounted to the vehicle in the inclined posture illustrated in FIG. 3, the drain port 41 is located on a perpendicular downward side and is surrounded by a partition wall 42 on an outer wall of the outer body 21.

In the above-described filler neck 100 that functions as the fuel supply device according to this embodiment, when the filler neck 100 is mounted to the vehicle in the inclined posture, the drain groove 110 is located on the perpendicular lower side and is made continuous with the fuel port 104 at the cutout portion 104c on the perpendicular lower side at the open lower end of the fuel port 104. Therefore, even if rainwater accumulates on the insertion-side open/close member 11 that is surrounded by the fuel port peripheral wall 104s in the vicinity of the drain groove 110, the accumulated rainwater accumulates at the cutout portion 104c and is draw into the drain groove 110 to inevitably enter the drain groove 110. Then, the accumulated rainwater is discharged to the outside along the drain groove 110 inclined toward the perpendicular lower side at the angle of inclination θ3 illustrated in FIG. 5. As a result, with the filler neck 100 according to this embodiment, the drain groove 110 exhibits high draining function.

Figure 6:
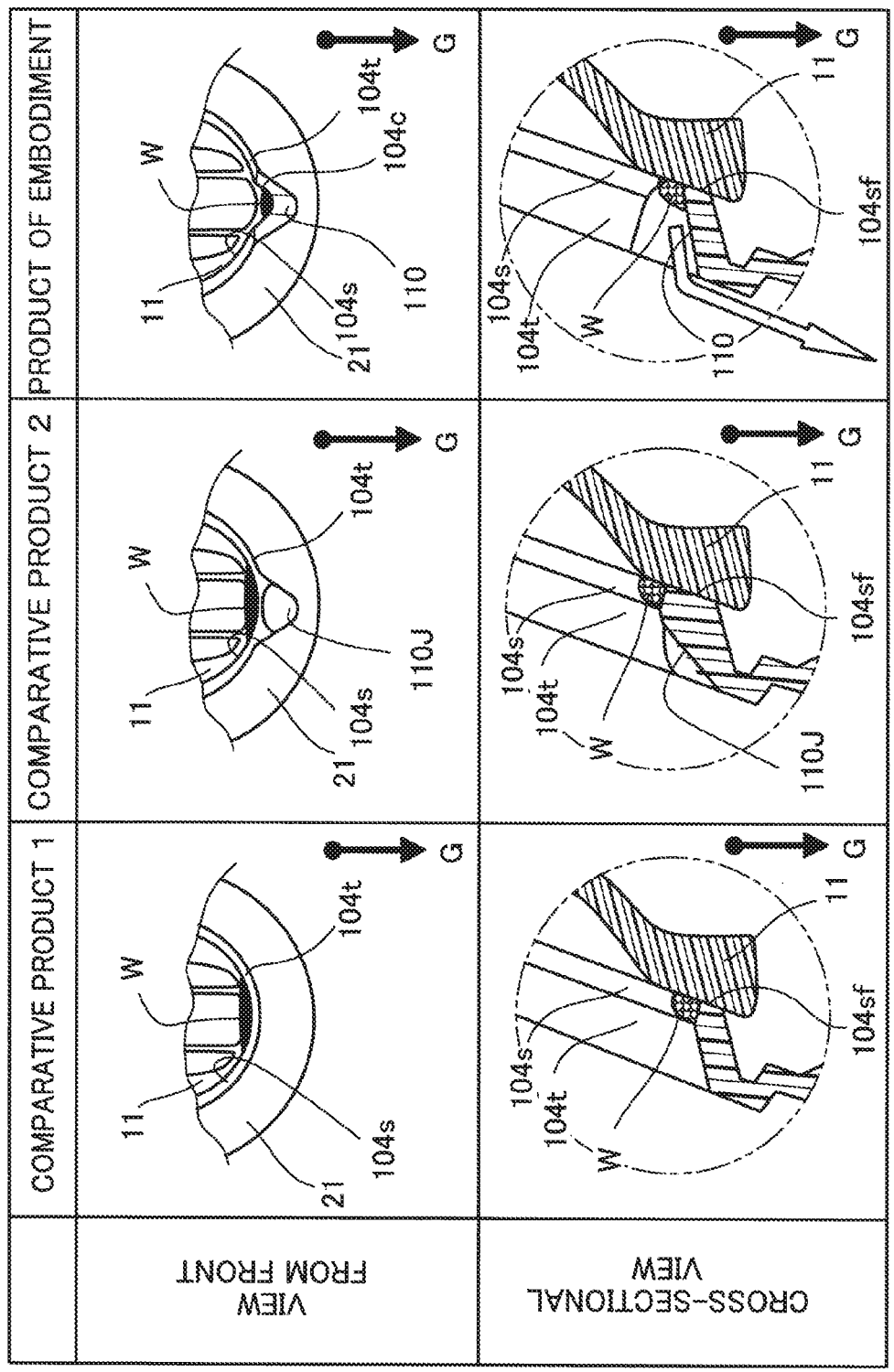
FIG. 6 is an explanatory diagram for illustrating the effect of the filler neck according to the embodiment compared to a comparative product when the filler neck includes a drain groove cut out from the fuel port together with a seating end face including an open lower end.

FIG. 6 is an explanatory diagram for illustrating the effect of the filler neck 100 according to this embodiment compared to a comparative product 1 when the filler neck 100 includes the drain groove 110 cut out from the fuel port 104 together with the seating end face including an open lower end. A comparative product 1 is an aspect that does not include the drain groove 110 and a comparative product 2 is an aspect only including a comparison drain groove 110J in the nozzle insertion-side peripheral wall 104t in the fuel port 104. This comparison drain groove 110J is a recessed groove that is cut out of a region of the tapered nozzle insertion-side peripheral wall 104t and differs from the drain groove 110 according to this embodiment in that the drain groove 110J is not cut out from the fuel port peripheral wall 104s which forms the seating face of the insertion-side open/close member 11 in a lower end.

As illustrated in FIG. 6, with the comparison product 1, even if rainwater W accumulates on the insertion-side open/close member 11 surrounded by the fuel port peripheral wall 104s on the perpendicular lower side of the fuel port 104, the accumulated rainwater W accumulates in the region surrounded by the fuel port peripheral wall 104s and cannot drip down along the front surface of the nozzle insertion-side peripheral wall 104t.

Even with the comparison product 2, even if the rainwater W accumulates on the insertion-side open/close member 11 surrounded by the fuel port peripheral wall 104s in the vicinity of the comparison drain groove 110J located on the perpendicular lower side of the fuel port 104, the accumulated rainwater W accumulates in the region surrounded by the fuel port peripheral wall 104s and cannot drip down far enough to reach the comparison drain groove 110J.

In contrast, as described above, with the filler neck 100 according to this embodiment, the drain groove 110 is continuous with the fuel port 104 at the cutout portion 104c on the perpendicular lower side. Therefore, as illustrated in the cross-sectional view of FIG. 6, the rainwater W inevitably enters the drain groove 110 from the cutout portion 104c and is discharged to the outside along the drain groove 110 as indicated by the white arrow in FIG. 6.

In addition, as illustrated in FIG. 5, the filler neck 100 according to this embodiment inclines toward a diameter expansion side of the fuel port 104 at the diameter expansion angle θ2 within a prescribed range exceeding 90° (for example, 100 to 115°) with respect to a front surface of the insertion-side open/close member 11 that is pushed against the lower end-side end face 104sf of the fuel port 104. Therefore, with the filler neck 100 according to this embodiment, because the drain groove 110 is inclined toward the perpendicular lower side after being made continuous with the fuel port 104 on the perpendicular lower side at an open lower end of the fuel port 104, accumulated rainwater can be drained more reliably along the drain groove 110 and draining performance can be improved.

Figure 7:
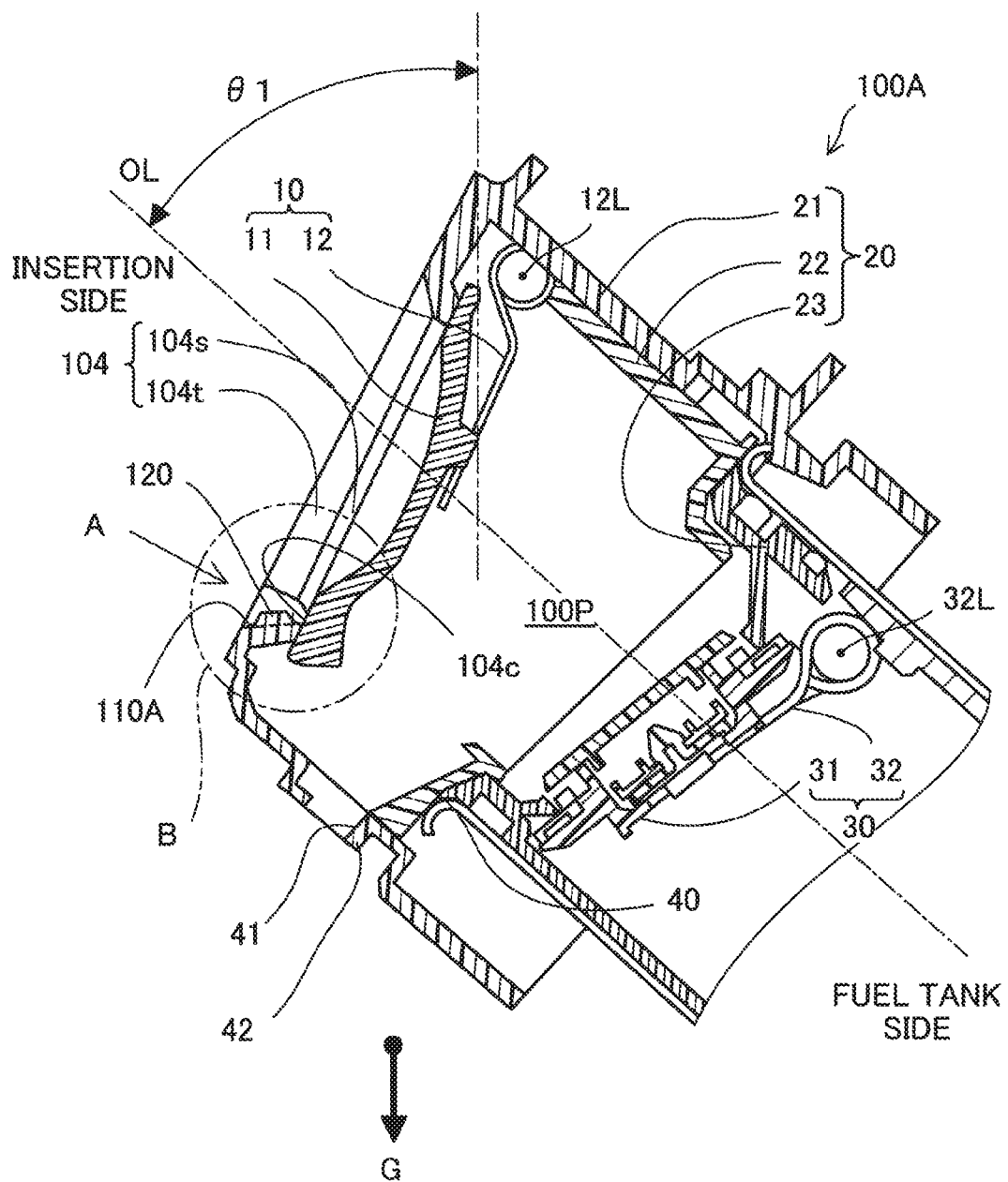
FIG. 7 is an explanatory diagram for illustrating the principle part of a filler neck that functions as a fuel supply device according to a first modification example when viewed from the cross section corresponding to FIG. 3.
Figure 8:
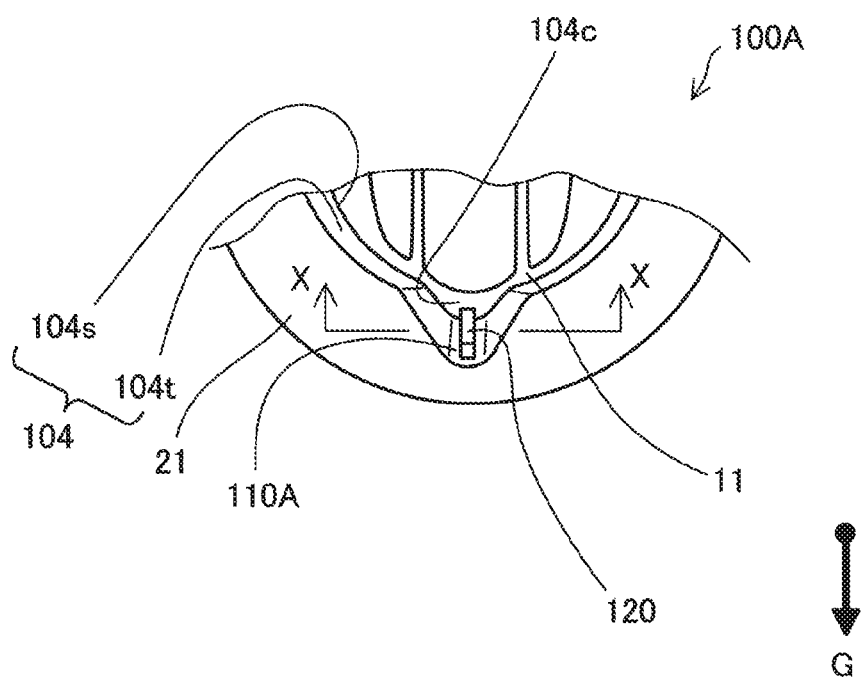
FIG. 8 is an explanatory diagram for illustrating the principle part of the filler neck when viewed from the front in the direction of the arrow A in FIG. 7.
Figure 9:
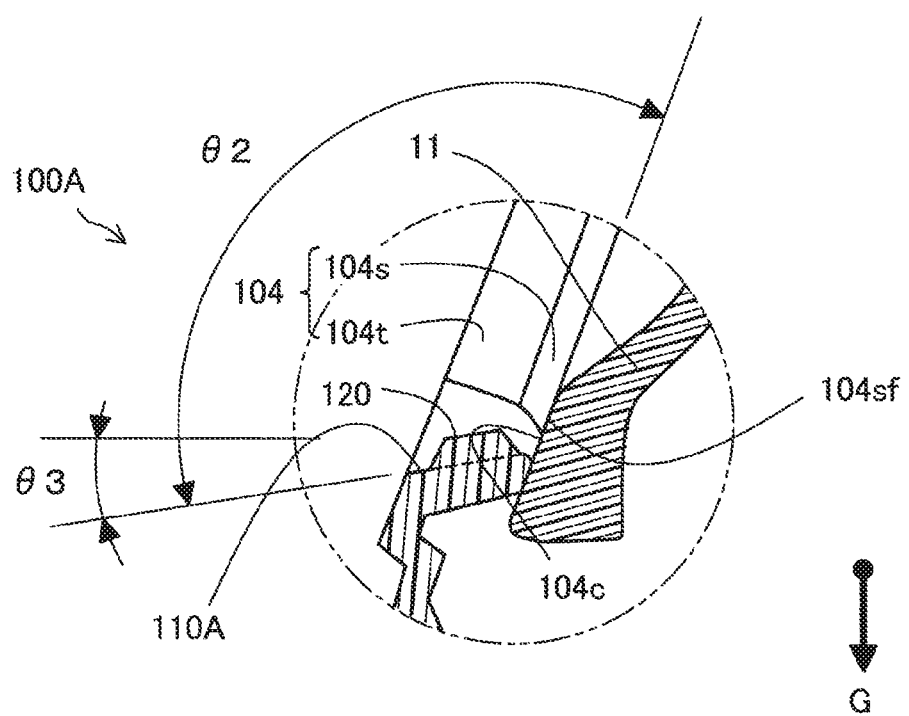
FIG. 9 is an explanatory diagram for illustrating the principle part portion B in FIG. 7 when magnified.
Figure 10:
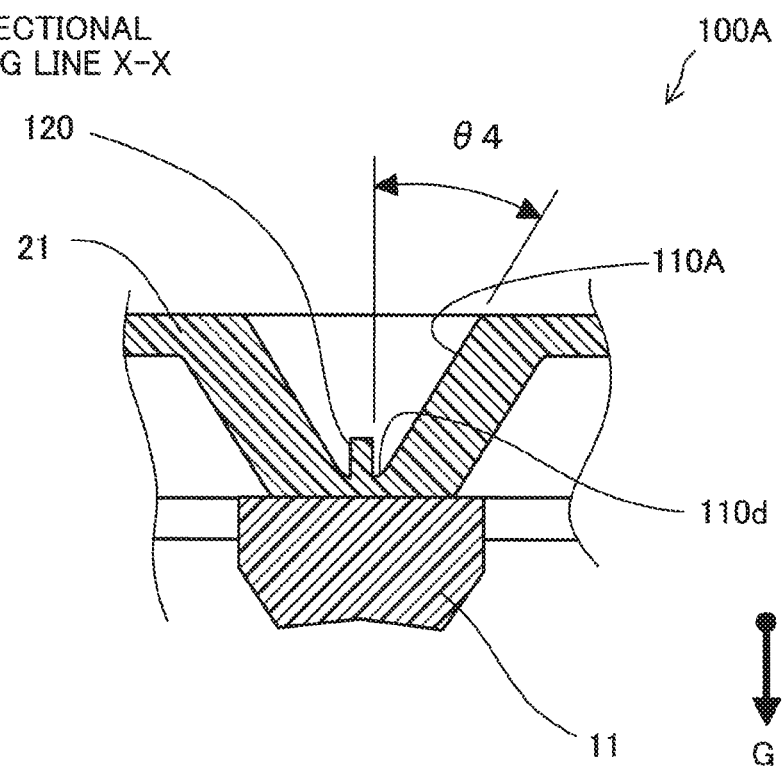
FIG. 10 is an explanatory diagram for illustrating a cross section of the principle part of the filler neck taken along the line X-X in FIG. 8.

FIG. 7 is an explanatory diagram for illustrating the principle part of a filler neck 100A in the fuel supply device according to a first modification example of a first embodiment as viewed from the cross section corresponding to FIG. 3. FIG. 8 is an explanatory diagram for illustrating the principle part of the filler neck 100A when viewed from the front in the direction of the arrow A in FIG. 7. FIG. 9 is an explanatory diagram for illustrating the principle part portion B in FIG. 7 when magnified. FIG. 10 is an explanatory diagram for illustrating a cross section of the principle part of the filler neck 100A taken along the line X-X in FIG. 8. The filler neck 100A according to the first modification example includes a drain groove 110A that is continuous with the fuel port 104 at the cutout portion 104c of the open lower end of the fuel port 104 on the perpendicular lower side, and is characterized by having a groove base portion 110d including a convex rib 120 formed along a groove longitudinal direction.

The convex rib 120 protrudes outward from the groove base portion 110d of the drain groove 110A in a state where the cutout portion 104c has been left, to thereby subdivide the open region of the drain groove 110A along the groove longitudinal direction on the side of the groove base portion 110d of the drain groove 110A. In other words, the convex rib 120 splits the drain groove 110A into two grooves. As illustrated in FIG. 10, through forming the convex rib 120, the drain groove 110A becomes an acute-angled groove having a groove angle, that is, a groove angle θ4 between a groove side face of the drain groove 110A and a protruding-side face of the convex rib 120 less than 90°.

Figure 11A:
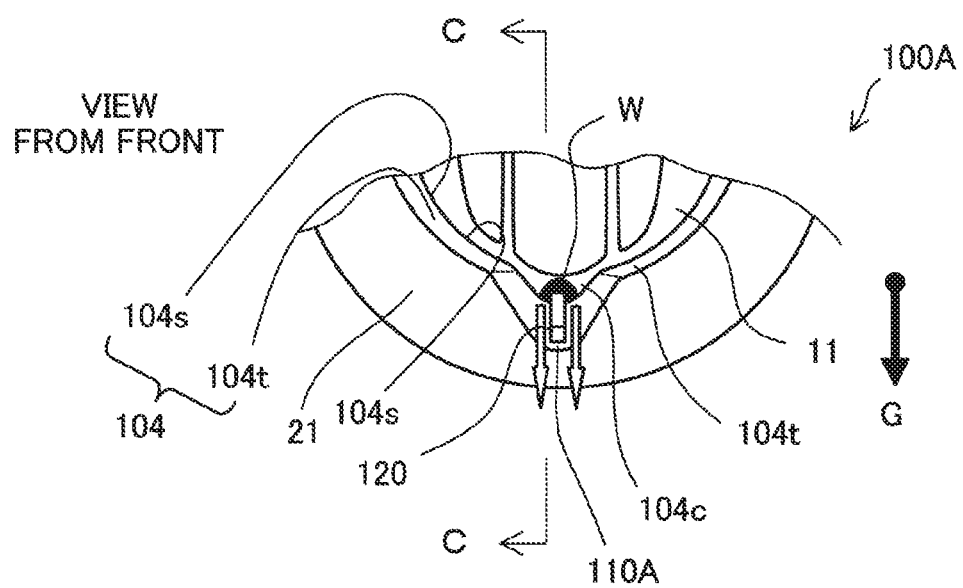
FIG. 11A is an explanatory diagram for schematically illustrating the state of accumulated rainwater in the filler neck according to the first modification example when viewed from the front.

FIG. 11A is an explanatory diagram for schematically illustrating the state of the accumulated rainwater W in the filler neck 110A according to the first modification example when viewed from the front. FIG. 11B is an explanatory diagram for schematically illustrating how the accumulated rainwater is discharged from the filler neck 100A according to the first modification example when viewed as a cross section taken along the line C-C. As illustrated in the diagrams, even if rainwater accumulates on the insertion-side open/close member 11 surrounded by the fuel port peripheral wall 104s in the vicinity of the drain groove 110A, the accumulated rainwater W inevitably enters a plurality of, more specifically, two acute-angle grooves formed by the convex rib 120 in the groove base portion 110d of the drain groove 110A and is discharged to the outside along the drain groove 110A. In addition, when rainwater enters the two grooves formed by the convex rib 120, the flow of the rainwater along the two grooves indicated by the white arrows in FIGS. 11A and 11B is promoted by the effect of surface tension on the rainwater because a groove angle θ4 of the two grooves is an acute angle and the two grooves have an angle of depression (angle facing downward in the horizontal direction). As a result, with the filler neck 100A according to the first modification example, draining function of the drain groove 110A can be further improved.

Figure 12A:
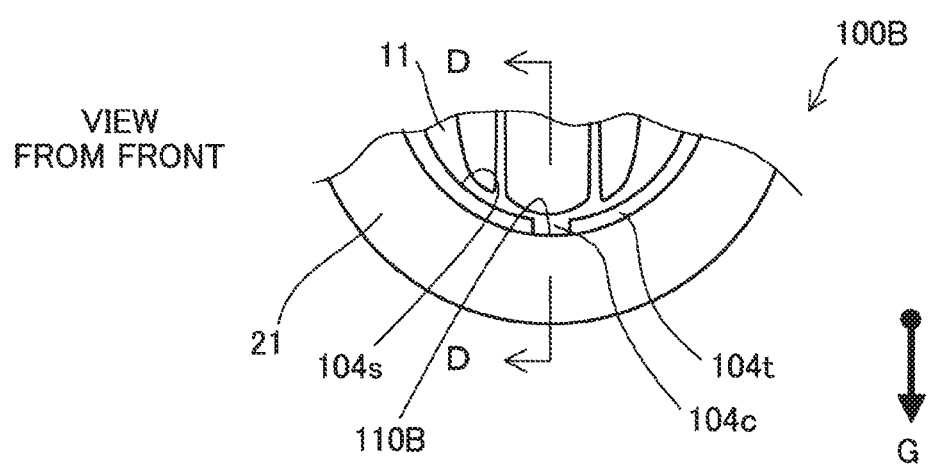
FIG. 12A is an explanatory diagram for schematically illustrating the principle part of a filler neck according to a second modification example when viewed from the front.

FIG. 12A is an explanatory diagram for schematically illustrating the principle part of a filler neck 100B according to a second modification example when viewed from the front. FIG. 12B is an explanatory diagram for schematically illustrating the principle part of the filler neck 100B according to the second modification example when viewed as a cross section taken along the line D-D. The filler neck 100B according to the second modification example is characterized by including a drain groove 110B formed by cutting out a portion of the nozzle insertion-side peripheral wall 104t together with the fuel port peripheral wall 104s on the perpendicular lower side. This drain groove 110B is also continuous with the fuel port 104 at the cutout portion 104c on the open lower end of the fuel port 104 on the perpendicular lower side. After the filler neck 100B according to the second modification example positions the drain groove 110B on the perpendicular lower side when mounted to the vehicle in the inclined posture, the filler neck 100B is inclined such that the drain groove 110B communicates with the fuel port 104 at the cutout portion 104c on the open lower end of the fuel port 104 on the perpendicular lower side and a groove tip side is closer to the perpendicular lower side than the cutout portion 104c side. Therefore, even with the filler neck 100B according to the second modification example, draining function of the drain groove 110B can be improved.

Figure 13:
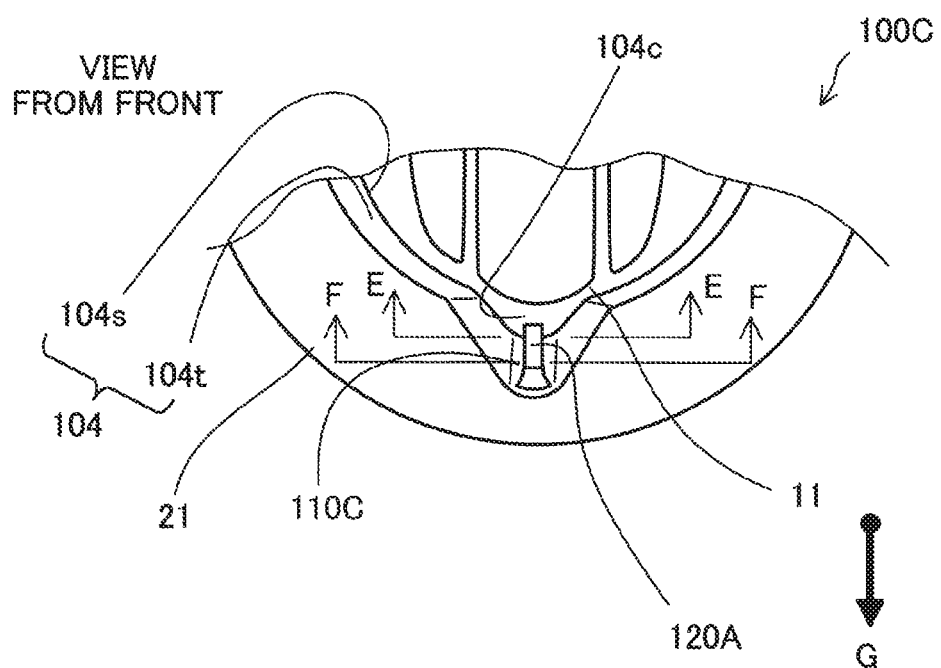
FIG. 13 is an explanatory diagram for schematically illustrating the principle part of a filler neck according to a third modification example when viewed from the front.
Figure 14A:
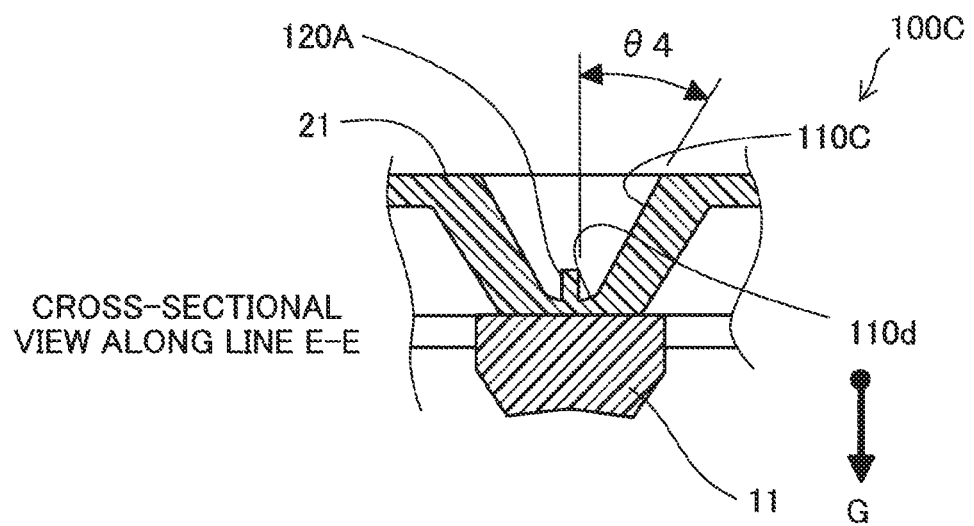
FIG. 14A is an explanatory diagram for schematically illustrating a cross section of the principle part of the filler neck taken along the line E-E in FIG. 13.
Figure 14B:
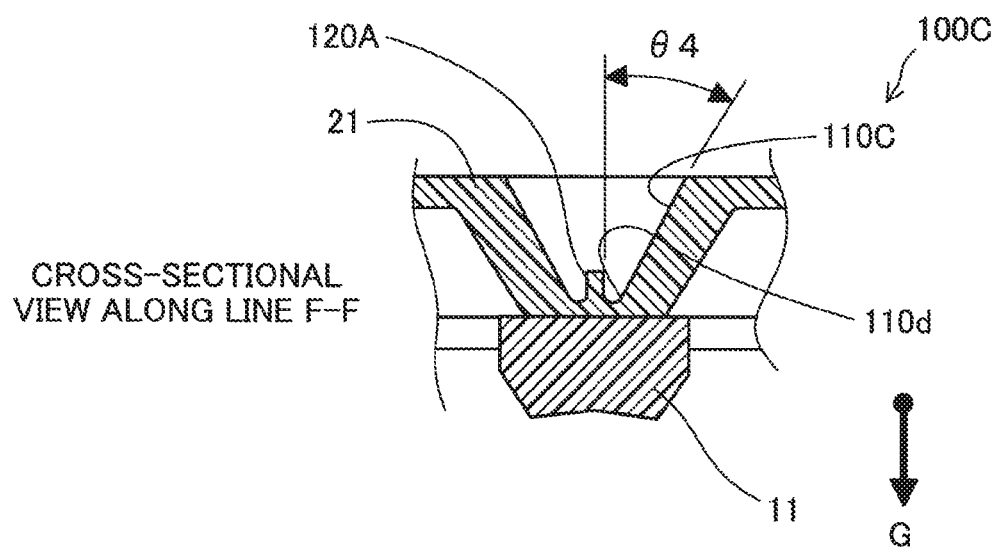
FIG. 14B is an explanatory diagram for schematically illustrating a cross section of the principle part of the filler neck taken along the line F-F in FIG. 13.

FIG. 13 is an explanatory diagram for schematically illustrating the principle part of a filler neck 100C according to a third modification example when viewed from the front. FIG. 14A is an explanatory diagram for illustrating a cross section of the principle part of the filler neck 100C taken along the line E-E in FIG. 13. FIG. 14B is an explanatory diagram for illustrating a cross section of the principle part of the filler neck 100C taken along the line F-F in FIG. 13. The filler neck 100C according to the third modification example is characterized in that the groove base portion 110d of the drain groove 110C that is continuous with the fuel port 104 at the cutout portion 104c on the open lower end of the fuel port 104 on the perpendicular lower side includes a convex rib 120A formed along a groove longitudinal direction. In addition, the shape of the base portion of the convex rib 120A differs between the side of the cutout portion 104c and the side separated from the cutout portion 104c. In other words, as illustrated in FIG. 14A, on the cutout portion 104c side, the convex rib 120A protrudes outward in a so-called pin shape from the groove base portion 110d of the drain groove 110C and, on the side separated from the cutout portion 104c, as illustrated in FIG. 14B, protrudes outward in an arc shape from the groove base portion 110d. With this configuration, in the filler neck 100C, the two acute angle grooves formed by the convex rib 120A in the groove base portion 110d of the drain groove 110C are made narrower than on the side of the cutout portion 104c on a discharge side of the groove path, that is, on the side separated from the cutout portion 104c. As a result, rainwater that has entered the two acute angle grooves on the cutout portion 104c side flows through narrow grooves on a discharge destination side when the rainwater flows along the groove path. Therefore, with the filler neck 100C according to the third modification example, because rainwater can be prevented from flowing along the groove paths in the two acute angle grooves formed by the convex rib 120A in the groove base portion 110d of the drain groove 110C, draining function of the drain groove 110C can be improved.

Figure 15:
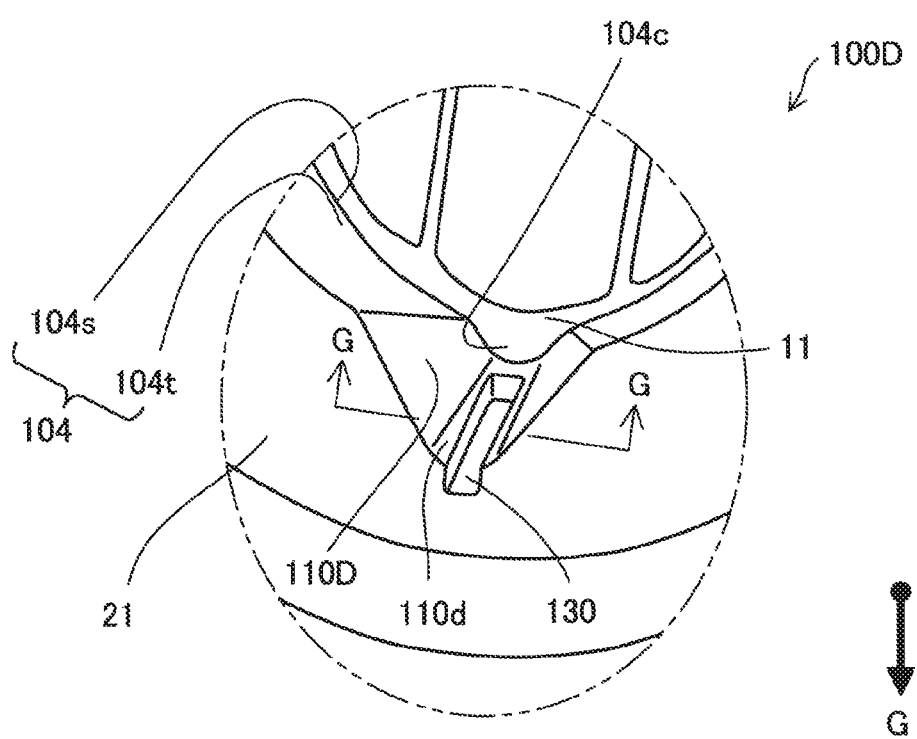
FIG. 15 is an explanatory diagram for schematically illustrating the principle part of a filler neck according to a fourth modification example when viewed obliquely.
Figure 16:
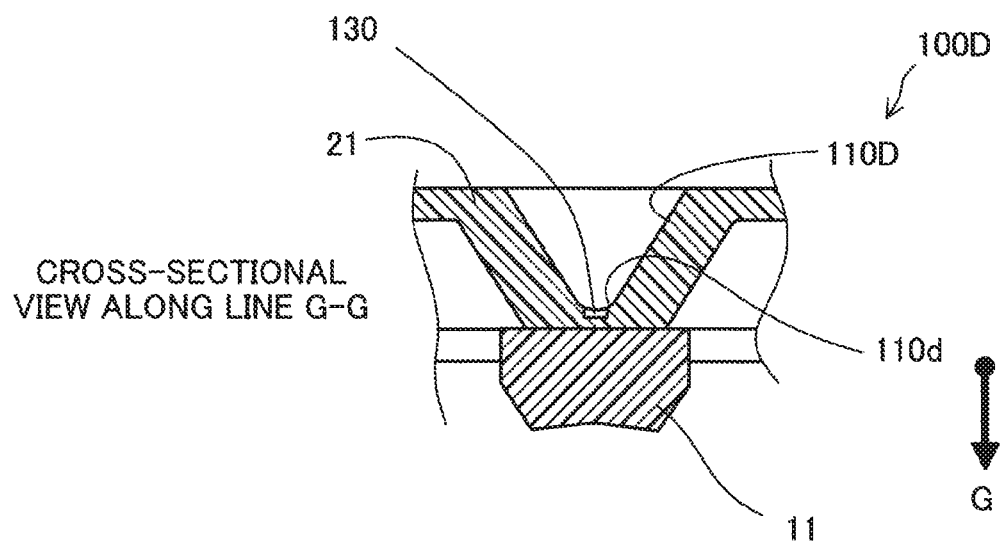
FIG. 16 is an explanatory diagram for illustrating a cross section of the principle part of the filler neck taken along the line G-G in FIG. 15.

FIG. 15 is an explanatory diagram for schematically illustrating the principle part of a filler neck 100D according to a fourth modification example when viewed from obliquely above. FIG. 16 is an explanatory diagram for illustrating a cross section of the principle part of the filler neck 100D taken along the line G-G in FIG. 15. The filler neck 100D according to the fourth modification example is characterized by including a drain groove 110D that is continuous with the fuel port 104 at the cutout portion 104c on the open lower end of the fuel port 104 on the perpendicular lower side. In addition, the groove base portion 110d of the drain groove 110D includes a concave groove 130 formed along the groove longitudinal direction.

The concave groove 130 is formed as a recess in the groove base portion 110d of the drain groove 110D so as to not reach the lower end-side end face 104sf and functions as a long and thin drain groove with a small width in the groove base portion 110d of the drain groove 110D. When the rainwater W accumulates on the insertion-side open/close member 11 surrounded by the fuel port peripheral wall 104s in the vicinity of the drain groove 110D, the rainwater W inevitably enters the narrow concave groove 130 formed in the groove base portion 110d of the drain groove 110D and is discharged to the outside along the concave groove 130. Furthermore, because the concave groove 130 is a drain groove that is narrower than the groove base portion 110d, the flow of rainwater along the concave groove 130 is promoted by the effect of surface tension on the rainwater. As a result, with the filler neck 100D according to the fourth modification example, draining function of the drain groove 110D can be further improved.

Figure 17:
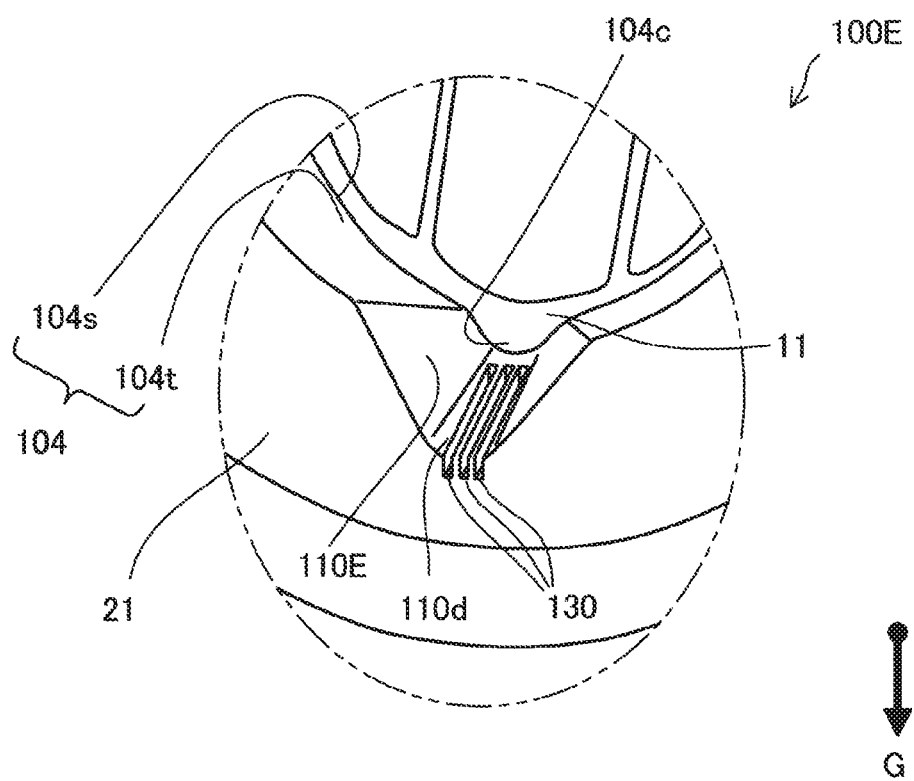
FIG. 17 is an explanatory diagram for schematically illustrating the principle part of a filler neck according to a fifth modification example when viewed obliquely.

FIG. 17 is an explanatory diagram for schematically illustrating the principle part of a filler neck 100E according to a fifth modification example when viewed from obliquely above. The filler neck 100E of the fifth modification example is characterized by including a drain groove 110E that is continuous with the fuel port 104 at the cutout portion 104c on the open lower end of the fuel port 104 on the perpendicular lower side. In addition, the groove base portion 110d of the drain groove 110E includes a plurality of, more specifically, three concave grooves 130 formed along the groove longitudinal direction.

Similar to the previous modification example, each concave groove 130 is formed as a recess in the groove base portion 110d so as to not reach the lower end-side end face 104sf and functions as a long and thin drain groove that is narrower than the groove base portion 110d of the drain groove 110E. When rainwater flows through the concave grooves 130, because each concave groove 130 is made narrower, the flow of rainwater along each concave groove 130 is promoted by the effect of surface tension on the rainwater. As a result, even with the filler neck 100E according to the fifth modification example, draining function of the drain groove 110E can be further improved.

The present disclosure is not limited to the above-described embodiments, examples and modification examples and can be implemented as various other configurations without departing from the gist of the present disclosure. For example, the technical characteristics in the embodiments, example and modification examples that correspond to the technical characteristics in the aspects described in SUMMARY can be replaced or combined as necessary in order to fully or partly solve the above-mentioned problem or fully or partly achieve the above-mentioned effects. In addition, any technical characteristics not described as essential herein can be omitted as necessary.

In the above-described embodiment and modification examples thereof, each of the drain grooves 110 to 110E are inclined toward diameter expansion side of the fuel port 104 at the diameter expansion angle θ2 within a prescribed range exceeding 90° with respect to a front surface of the insertion-side open/close member 11 that is pushed against the lower end-side end face 104sf of the fuel port 104, but the drain groove 110 and other drain grooves can be inclined toward the diameter expansion side of the fuel port 104 such that a groove tip side is closer to the perpendicular lower side than the side with the cutout portion 104c.

In the above-described embodiment and modification examples thereof, each drain groove 110 to 110E is a groove with a V-shaped cross section, but the drain grooves 110 to 110E can be a groove with an arc-shaped cross section, a rectangular cross section, or a cross section having another shape.

In the first modification example, the convex rib 120 is a rib that has a rectangular cross section and protrudes outward from the groove base portion 110d of the drain groove 110A, but the convex rib can be formed so as to have a ridge in the groove direction and a triangular cross section that is a surface inclined from the ridge to the groove base portion 110d. In addition, a plurality of convex ribs 120 can be formed in the drain groove 110A and be inclined to protrude outward from the groove base portion 110d of the drain groove 110A.

In the fourth and fifth modification examples, the concave groove 130 is formed as a recess in the groove base portion 110d so as not to reach the lower end-side end face 104sf. However, the concave groove 130 can be formed so as to reach the lower end-side end face 104sf. In addition, two concave grooves 130 can be formed.

A modification example including either the convex rib 120 or the concave groove 130 can be configured to include both the convex rib 120 and the concave groove 130.

What is claimed is:

1. A fuel supply device to be mounted to a vehicle, the fuel supply device comprising:
   a fuel port forming portion including a peripheral wall that forms a fuel port that receives a fuel nozzle from an open end side, and a fuel path that extends from the fuel port to a fuel tank; and
   an insertion-side open/close member that can open/close an open base portion of the fuel port from the fuel path side and moves to a fuel port open position as a result of insertion of the fuel nozzle, wherein
   in the fuel port forming portion, at a portion of the peripheral wall located on a perpendicular lower side when the fuel supply device is in a mounting posture of being mounted to the vehicle, a concave drain groove is provided, and the concave drain groove extends from a portion at which the insertion-side open/close member makes contact with the open base portion of the fuel port to the open end side of the fuel port,
   the drain groove is formed as a cutout portion, which corresponds to the peripheral wall cut out, with the lower end-side end face at the portion at which the insertion-side open/close member makes contact with the open base portion of the fuel port, and
   the drain groove is inclined in a horizontal direction such that the open end side is located closer to the perpendicular lower side than the cutout portion side when the fuel supply device is in the mounting posture.

2. The fuel supply device according to claim 1, wherein the drain groove is formed so as to be inclined toward a diameter expansion side of the fuel port at an angle within a prescribed range exceeding 90° with respect to a front surface of the insertion-side open/close member that closes the fuel port.

3. The fuel supply device according to claim 1, wherein the drain groove includes a groove base portion formed with a convex rib along a groove longitudinal direction.

4. The fuel supply device according to claim 1, wherein the drain groove includes a groove base portion formed with a concave groove along a groove longitudinal direction.

5. The fuel supply device according to claim 1, wherein the drain groove is formed with a V-shaped groove cross section.

6. A fuel supply device to be mounted to a vehicle, the fuel supply device comprising:
   an outer body including a peripheral wall that forms a fuel port that receives a fuel nozzle from an open end side, and a fuel path that extends from the fuel port to a fuel tank; and
   an insertion-side open/close member that can open/close a lower end-side end face of the fuel port from the fuel path side and moves to a fuel port open position as a result of insertion of the fuel nozzle, wherein
   in the outer body, at a portion of the peripheral wall located on a perpendicular lower side when the fuel supply device is in a mounting posture of being mounted to the vehicle, a concave drain groove is provided, and the concave drain groove is cut out from the open end side of the fuel port to the lower end-side end face,
   the drain groove is formed as a cutout portion, which corresponds to the peripheral wall cut out, with the lower end-side end face at the portion at which the insertion-side open/close member makes contact with the open base portion of the fuel port, and
   the drain groove is inclined in a horizontal direction such that the open end side is located closer to the perpendicular lower side than the lower end-side end face side when the fuel supply device is in the mounting posture.

7. The fuel supply device according to claim 6, wherein the drain groove is formed so as to be inclined toward a diameter expansion side of the fuel port at an angle within a prescribed range exceeding 90° with respect to a front surface of the insertion-side open/close member that closes the fuel port.

8. The fuel supply device according to claim 6, wherein the drain groove includes a groove base portion formed with a concave groove along a groove longitudinal direction.

9. The fuel supply device according to claim 6, wherein the drain groove is formed with a V-shaped groove cross section.

10. A fuel supply device to be mounted to a vehicle, the fuel supply device comprising:
- an outer body including a peripheral wall that forms a fuel port that receives a fuel nozzle from an open end side, and a fuel path that extends from the fuel port to a fuel tank; and
- an insertion-side open/close member that can open/close a lower end-side end face of the fuel port from the fuel path side and moves to a fuel port open position as a result of insertion of the fuel nozzle, wherein
- in the outer body, a portion of the peripheral wall located on a perpendicular lower side when the fuel supply device is in a mounting posture of being mounted to the vehicle is formed as a concave drain groove that is cut out from the open end side of the fuel port to the lower end-side end face,
- the drain groove is inclined in a horizontal direction such that the open end side is located closer to the perpendicular lower side than the lower end-side end face side when the fuel supply device is in the mounting posture, and
- the drain groove includes a groove base portion formed with a convex rib along a groove longitudinal direction.

* * * * *